US012651158B2

(12) United States Patent (10) Patent No.: US 12,651,158 B2

Lee et al. (45) Date of Patent: Jun. 9, 2026

(54) NEURAL NETWORK TRAINING METHOD AND APPARATUS USING TREND

(71) Applicant: Samsung Electronics Co., Ltd., Suwon-si (KR)

(72) Inventors: Jun Haeng Lee, Hwaseong-si (KR); Seongjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1084 days.

(21) Appl. No.: 17/721,989

(22) Filed: Apr. 15, 2022

(65) Prior Publication Data

US 2023/0058341 A1 Feb. 23, 2023

(30) Foreign Application Priority Data

Aug. 20, 2021 (KR) ........................ 10-2021-0110159

(51) Int. Cl.
*G06N 3/08* (2023.01)
(52) U.S. Cl.
CPC ..................................... *G06N 3/08* (2013.01)
(58) Field of Classification Search
CPC ............................... G06N 3/08; G06N 3/0464
See application file for complete search history.

(56) References Cited

U.S. PATENT DOCUMENTS 10,210,860 B1 2/2019 Ward et al.
10,902,343 B2 1/2021 Andrews et al.

<table>
<tr><td>2008/0103847</td><td>A1*</td><td>5/2008</td><td>Sayal ..................... G06Q 30/04<br>705/7.37</td></tr>
<tr><td>2008/0148168</td><td>A1*</td><td>6/2008</td><td>Koran ................. G06F 16/2428<br>715/771</td></tr>
<tr><td>2018/0285780</td><td>A1*</td><td>10/2018</td><td>Ouyang ................. G06F 17/18</td></tr>
<tr><td>2019/0286983</td><td>A1</td><td>9/2019</td><td>Jung et al.</td></tr>
<tr><td>2019/0293462</td><td>A1</td><td>9/2019</td><td>Choi et al.</td></tr>
<tr><td>2020/0019052</td><td>A1</td><td>1/2020</td><td>Swanson et al.</td></tr>
<tr><td>2020/0285899</td><td>A1*</td><td>9/2020</td><td>Chen ....................... G06F 17/15</td></tr>
<tr><td>2020/0342306</td><td>A1*</td><td>10/2020</td><td>Giovannini .......... G06N 3/0475</td></tr>
</table>

(Continued)

FOREIGN PATENT DOCUMENTS

CN 110929786 A 3/2020
CN 111191791 A 5/2020

(Continued)

OTHER PUBLICATIONS

Brownlee et.al, "How to Use and Remove Trend Information from Time Series Data in Python", Aug. 15, 2020 (Year: 2020).*

(Continued)

*Primary Examiner* — Alexey Shmatov
*Assistant Examiner* — Duy T Diep
(74) *Attorney, Agent, or Firm* — NSIP Law

(57) ABSTRACT

A neural network training method and apparatus are disclosed, where the neural network training method using trend includes receiving original training data and trend information, obtaining a first prediction value and a first loss from a neural network based on the original training data, obtaining a second prediction value from the neural network based on the original training data using the trend information, determining a target loss by modifying the first loss based on the first prediction value and the second prediction value, and training the neural network based on the target loss.

24 Claims, 6 Drawing Sheets

(56) References Cited

U.S. PATENT DOCUMENTS

| | | | | | |
|---|---|---|---|---|---|
| 2020/0380409 A1* | 12/2020 | Seo | ........................ | G06N 5/04 |
| 2020/0394523 A1* | 12/2020 | Liu | ........................ | G06N 3/09 |
| 2021/0117776 A1* | 4/2021 | Cheng | ................. | G06N 3/0464 |
| 2021/0406695 A1* | 12/2021 | Pandarinath | ......... | G06N 3/0455 |
| 2022/0222525 A1* | 7/2022 | Lee | ..................... | G06N 3/0464 |
| 2023/0215159 A1* | 7/2023 | Deng | .................. | G06V 10/774 |
| | | | | 382/157 |
| 2024/0044539 A1* | 2/2024 | Hashikawa | ........ | G05B 23/0221 |

FOREIGN PATENT DOCUMENTS

| | | | |
|---|---|---|---|
| CN | 110443143 | B | 12/2020 |
| CN | 112765354 | A | 5/2021 |
| KR | 10-2021-0048058 | A | 5/2021 |

OTHER PUBLICATIONS

Suresha et.al, "Sampling Techniquesâ Statistical approach in Machine learning", Jan. 16, 2021 (Year: 2021).*

Shorten, Connor, et al. "A survey on Image Data Augmentation for Deep Learning." *Journal of big data Volume 6 Article 1* 2019 (48 pages in English).

Chen, Chun Han, et al. "Physics-Prior Bayesian Neural Networks in Semiconductor Processing." *IEEE Access Volume 7 DOI:10.1109/ ACCESS.2019.2940130* Sep. 24, 2019 (12 pages in English).

* cited by examiner

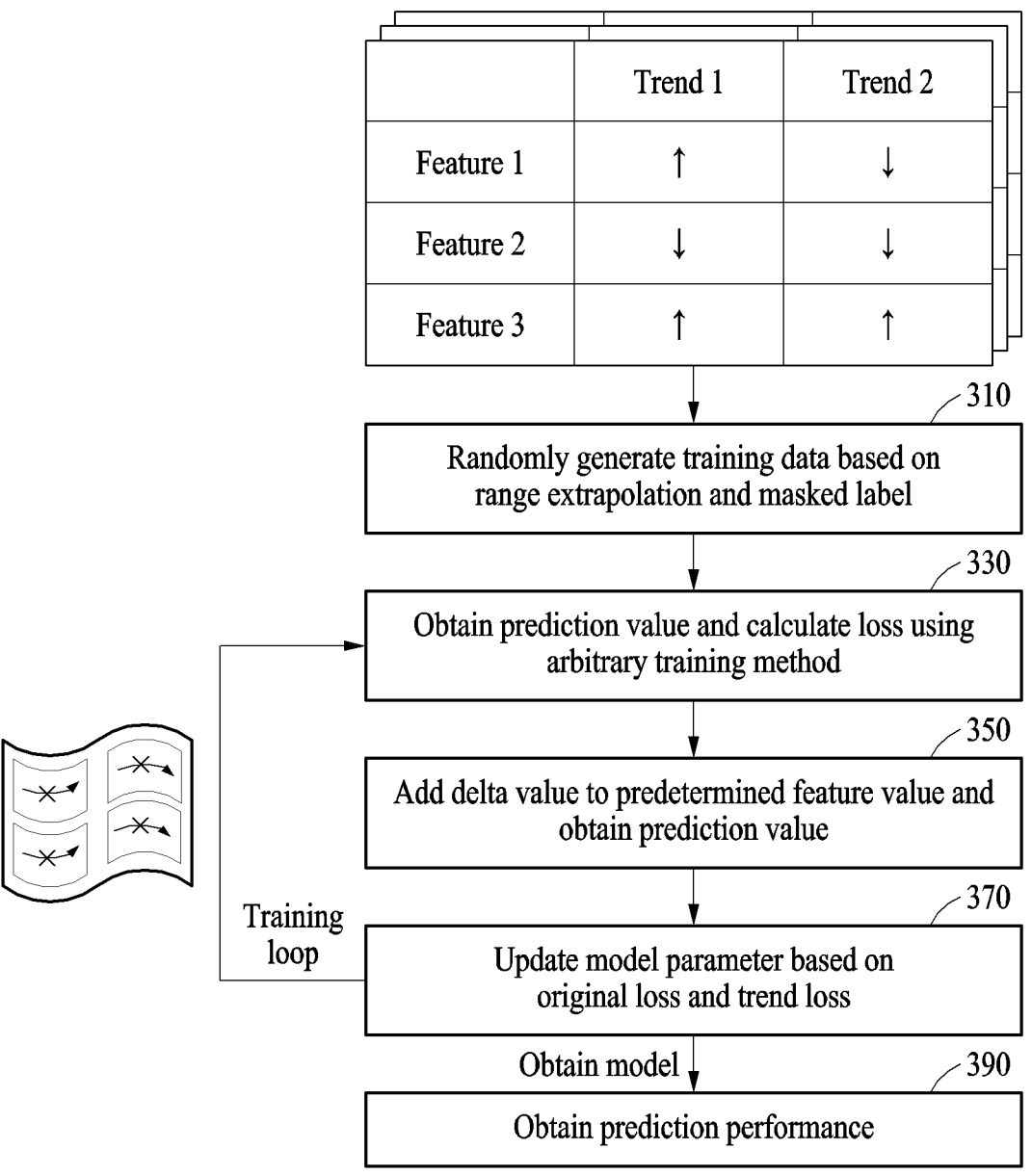

| | Trend 1 | Trend 2 |
|---|---|---|
| Feature 1 | ↑ | ↓ |
| Feature 2 | ↓ | ↓ |
| Feature 3 | ↑ | ↑ |

310

Randomly generate training data based on range extrapolation and masked label

330

Obtain prediction value and calculate loss using arbitrary training method

350

Add delta value to predetermined feature value and obtain prediction value

370

Training loop

Update model parameter based on original loss and trend loss

Obtain model

390

Obtain prediction performance

FIG. 3

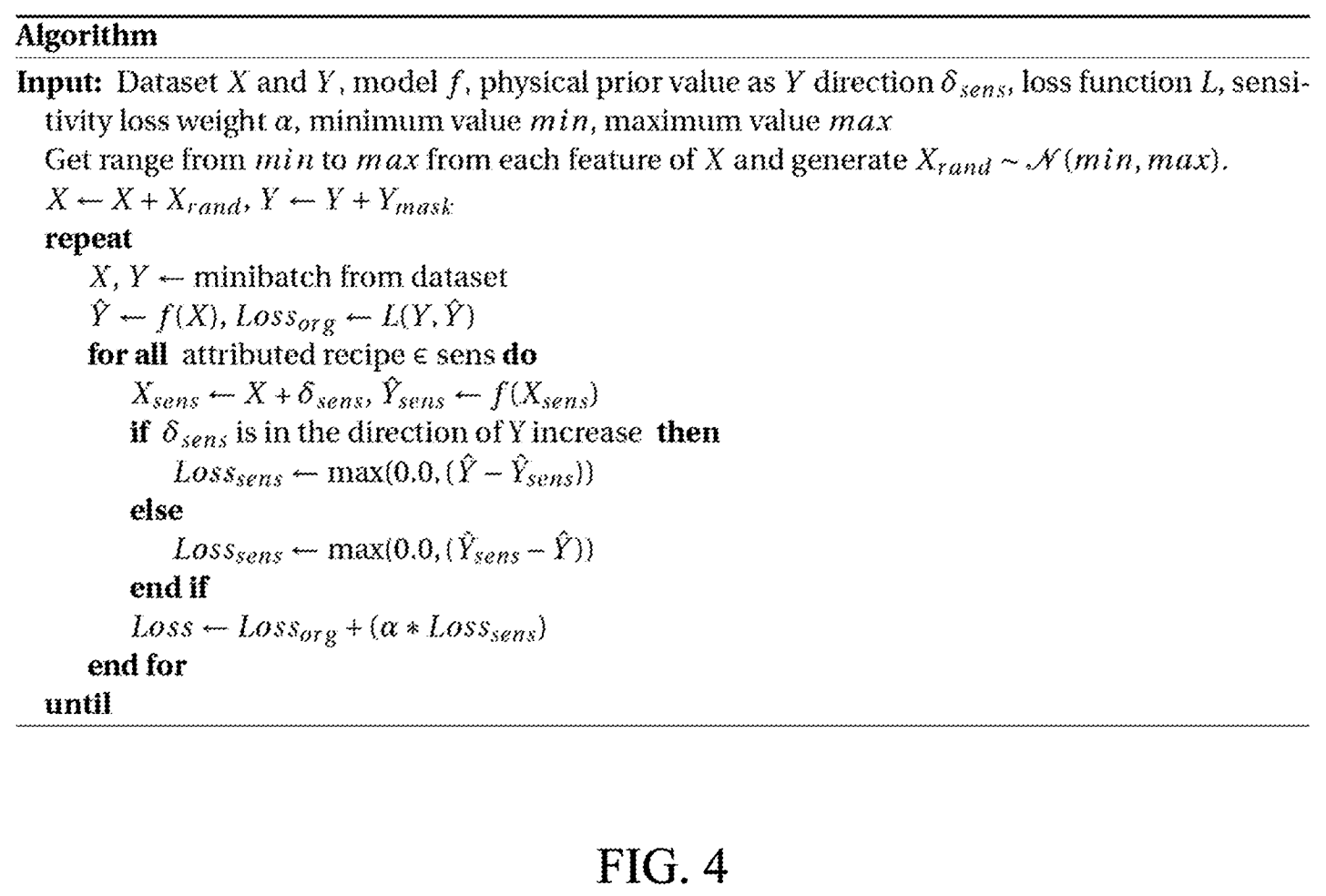

Algorithm

Input: Dataset $X$ and $Y$, model $f$, physical prior value as $Y$ direction $\delta_{sens}$, loss function $L$, sensitivity loss weight $\alpha$, minimum value $min$, maximum value $max$ Get range from $min$ to $max$ from each feature of $X$ and generate $X_{rand} \sim \mathcal{N}(min, max)$.

$X \leftarrow X + X_{rand}, Y \leftarrow Y + Y_{mask}$.

repeat

$X, Y \leftarrow$ minibatch from dataset $\hat{Y} \leftarrow f(X), Loss_{org} \leftarrow L(Y, \hat{Y})$ for all attributed recipe $\in$ sens do

$X_{sens} \leftarrow X + \delta_{sens}, \hat{Y}_{sens} \leftarrow f(X_{sens})$ if $\delta_{sens}$ is in the direction of $Y$ increase then

$Loss_{sens} \leftarrow \max(0.0, (\hat{Y} - \hat{Y}_{sens}))$ else

$Loss_{sens} \leftarrow \max(0.0, (\hat{Y}_{sens} - \hat{Y}))$ end if

$Loss \leftarrow Loss_{org} + (\alpha * Loss_{sens})$ end for until

FIG. 4

NEURAL NETWORK TRAINING METHOD AND APPARATUS USING TREND

CROSS-REFERENCE TO RELATED APPLICATIONS

This application claims the benefit under 35 USC § 119(a) of Korean Patent Application No. 10-2021-0110159, filed on Aug. 20, 2021, in the Korean Intellectual Property Office, the entire disclosure of which is incorporated herein by reference for all purposes.

BACKGROUND

1. Field

The following description relates to a neural network training method and apparatus using trend.

2. Description of Related Art

Recently, attempts are being made to learn various phenomena or relationships from data using artificial intelligence (AI) or deep learning. A deep learning technique generally requires a large quantity of training data to achieve accuracy.

When the quantity of training data is small, there are significant limitations on utilization of conventional deep learning-based methods. To compensate, a data augmentation technique may be used.

Various data augmentation methods are present, however in general, the methods are limited to changing an input value of a neural network model within a range in which an output value of the neural network model does not change. In this case, a regression issue which may sensitively change an output value of the neural network according to an input value may limit accuracy in augmenting the output value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network training method using trend, the neural network training method including receiving original training data and trend information, obtaining a first prediction value and a first loss from a neural network based on the original training data, obtaining a second prediction value from the neural network based on the original training data using the trend information, determining a target loss by modifying the first loss based on the first prediction value and the second prediction value, and training the neural network based on the target loss.

The trend information may include information on a direction of a change in the training data.

The obtaining of the first prediction value and the first loss may include generating random training data based on a feature of the original training data, and obtaining the first prediction value and the first loss from the neural network based on the random training data.

The generating of the random training data may include generating random input data by modifying a range of input data of the neural network based on a minimum value and a maximum value of the input data from among the original training data, and masking a portion of output data of the neural network from among the original training data.

The generating of the random input data may include calculating a modification range based on the minimum value, the maximum value, and the feature, generating an expanded range by expanding the minimum value and the maximum value based on the modification range, and generating the random input data based on the expanded range.

The obtaining of the second prediction value may include generating training data reflecting a trend by adjusting the random training data using the trend information, and obtaining the second prediction value from the neural network based on the adjusted training data.

The determining of the target loss may include calculating a trend loss based on a difference between the first prediction value and the second prediction value, and determining the target loss by modifying the first loss based on the trend loss.

The calculating of the trend loss based on the difference between the first prediction value and the second prediction value may include calculating the trend loss based on subtracting the second prediction value from the first prediction value, in response to the output data of the neural network changing in an increasing direction by the trend, and calculating the trend loss based on subtracting the first prediction value from the second prediction value, in response to the output data of the neural network changing in a decreasing direction by the trend.

The determining of the target loss by modifying the first loss based on the trend loss may include determining a hyperparameter for the trend loss, and determining the target loss by adding a product of the hyperparameter and the trend loss to the first loss.

In another general aspect, there is provided a neural network training apparatus using trend, the neural network training apparatus including a receiver configured to receive original training data and trend information, and a processor configured to obtain a first prediction value and a first loss from a neural network based on the original training data, obtain a second prediction value from the neural network based on the original training data using the trend information, determine a target loss by modifying the first loss based on the first prediction value and the second prediction value, and train the neural network based on the target loss.

The trend information may include information on a direction of a change in the training data.

The processor may be configured to generate random training data based on a feature of the original training data, and obtain the first prediction value and the first loss from the neural network based on the random training data.

The processor may be configured to generate random input data by modifying a range of input data of the neural network based on a minimum value and a maximum value of the input data from among the original training data, and mask a portion of output data of the neural network from among the original training data.

The processor may be configured to calculate a modification range based on the minimum value, the maximum value, and the feature, generate an expanded range by expanding the minimum value and the maximum value based on the modification range, and generate the random input data based on the expanded range.

The processor may be configured to generate training data reflecting a trend by adjusting the random training data using the trend information, and obtain the second prediction value from the neural network based on the adjusted training data.

The processor may be configured to calculate a trend loss based on a difference between the first prediction value and the second prediction value, and determine the target loss by modifying the first loss based on the trend loss.

The processor may be configured to calculate the trend loss based on subtracting the second prediction value from the first prediction value, in response to the output data of the neural network changing in an increasing direction by the trend, and calculate the trend loss based on subtracting the first prediction value from the second prediction value, in response to the output data of the neural network changing in a decreasing direction by the trend.

The processor may be configured to determine a hyperparameter for the trend loss, and determine the target loss by adding a product of the hyperparameter and the trend loss to the first loss.

In another general aspect, there is provided a neural network training method using trend, the neural network training method including receiving original training data and trend information, generating random training data based on a feature of the original training data, obtaining a first prediction value and a first loss from a neural network based on the random training data, adjusting the random training data using the trend information, obtaining a second prediction value from the neural network based on the adjusted random training data, determining a target loss by modifying the first loss based on the first prediction value and the second prediction value, and training the neural network based on the target loss.

The generating of the random training data may include modifying a range of input data of the neural network based on a minimum value and a maximum value of the input data from among the original training data.

The generating of the random training data may include calculating a modification range based on a feature of the original training data, the minimum value, and the maximum value, and generating the random training data from by expanding a range of the minimum value and the maximum value based on the modification range.

The determining of the target loss may include determining a trend loss based on a difference between the first prediction value and the second prediction value, determining a hyperparameter to adjust between the first loss and the trend loss, and determining the target loss based on adding a product of the hyperparameter and the trend loss to the first loss.

Other features and aspects will be apparent from the following detailed description, the drawings, and the claims.

BRIEF DESCRIPTION OF THE DRAWINGS

FIG. 3 illustrates an example of a trend learning process of the neural network training apparatus of FIG. 1.

FIG. 4 illustrates an example of an algorithm performed by the neural network training apparatus of FIG. 1.

Figure 1:
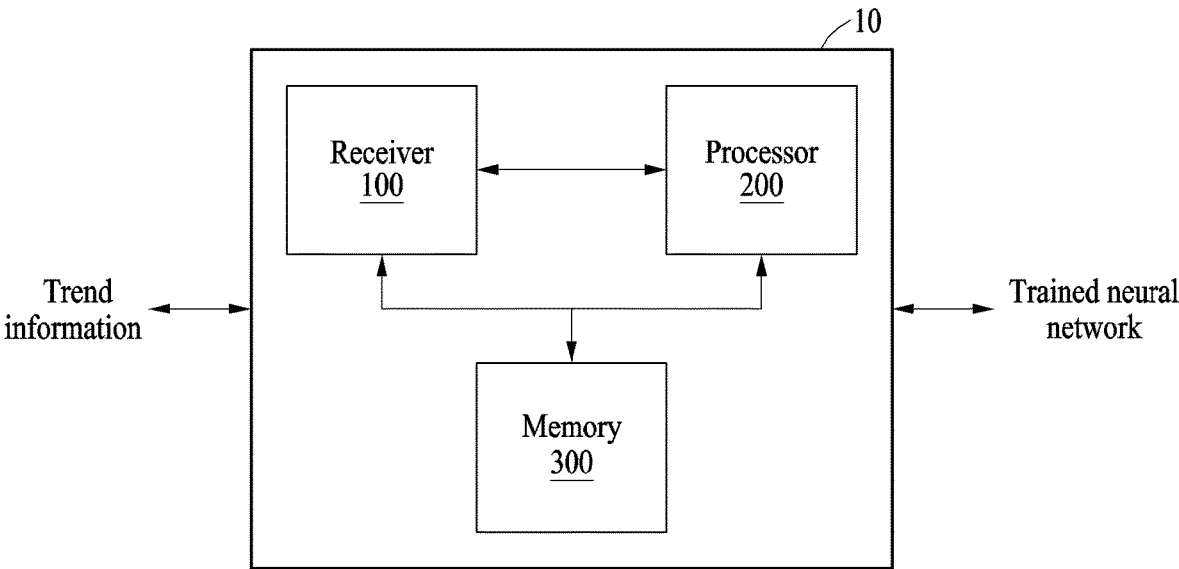
FIG. 1 illustrates an example of a neural network training apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a neural network training apparatus.

Referring to FIG. 1, a neural network training apparatus 10 may train a neural network. The neural network training apparatus 10 may output a trained neural network by training the neural network using trend information.

The neural network training apparatus 10 may generate an operation result obtained by performing a neural network operation by receiving data. The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and to provide an inference operation based on the feature data. The feature data may be data associated with a feature obtained by abstracting input data. If input data is an image, feature data may be data obtained by abstracting the image and may be represented in a form of, for example, a vector. The neural network may map input data and output data that are in a nonlinear relationship based on deep learning, to perform inference operation. The deep learning, which is a machine learning method used for tasks such as speech recognition or speech transliteration from a big data set, may map input data and output data to each other through supervised and/or unsupervised learning.

The inference operation may include, for example, pattern recognition (e.g., object recognition, facial identification, etc.), sequence recognition (e.g., speech, gesture, and written text recognition, machine translation, machine interpretation, machine transliteration etc.), control (e.g., vehicle control, process control, etc.), recommendation services, decision making, medical diagnoses, financial applications, data mining, and the like.

The neural network may be implemented as an architecture having a plurality of layers including an input image, feature maps, and an output. In the neural network, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network may be finally output.

For example, when an image of a 24×24 pixel size is input to the neural network, the input image may be output as feature maps of 4 channels each having a 20×20 size through a convolution operation with weights. Also, some of the pixel values of the feature maps of 4 channels each having the 20×20 size may be subject to a sub-sampling operation, such as, for example, max-pooling and average-pooling, to output feature maps of 4 channels each having a 10×10 size. In an example, the 10×10 feature maps may be repeatedly subject to convolution operations and sub-sampling operations with weights so that the sizes of the 10×10 feature maps may be reduced, and global features may be output. The neural network may repeatedly perform convolution operations and sub-sampling (or pooling) operations on the several layers to filter robust features, i.e., global features that are capable of representing the input image from the input image, to output the global features, and to input the global features to the fully connected layer, thereby recognizing the input image.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

Data input to the input layer is processed through hidden layers, and thus an output value is output from the output layer. In this case, the larger the weight is, the stronger the connectivity between two corresponding nodes becomes. On the other hand, the smaller the weight is, the weaker the connectivity between the two corresponding nodes becomes. For example, a weight may have a value between 0 and 1. When the weight is 0, it may indicate that there is no connectivity between two nodes.

On the other hand, as the connectivity through the weight increases, the connectivity of an artificial neural network may be strengthened and the complexity thereof may increase. As a result, memory allocation for storing the weight increases, and the overall operation speed of the artificial neural network may decrease, and thus the efficiency of the artificial neural network may deteriorate.

In an example, training an artificial neural network may indicate determining and updating weights and biases between layers or weights and biases among a plurality of nodes belonging to different layers adjacent to one another. In an example, weights and biases of a plurality of layered structures, a plurality of layers, or nodes may be collectively referred to as connectivity of an artificial neural network. Therefore, training an artificial neural network may indicate construction and training of the connectivity.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme training machine (ELM), an echo state network (ESN), a deep residual network (DRN), a differentiable neural computer (DNC), a neural turning machine (NTM), a capsule network (CN), a Kohonen network (KN), and an attention network (AN).

The neural network training apparatus 10 may include a receiver 100 and a processor 200. The neural network training apparatus 10 may further include a memory 300.

The receiver 100 may receive data. The receiver 100 may include a receiving interface. The receiver 100 may receive original training data and trend information. The trend information may include information on a direction of a change in training data. The training data may include input data of the neural network and output data of the neural network. The receiver 100 may output the original training data and the trend information to the processor 200.

The processor 200 may process data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor is provided below.

The processor 200 may obtain a first prediction value and a first loss from the neural network based on the original training data. The processor 200 may generate random training data based on a feature of the original training data.

The processor 200 may generate random input data by modifying a range of input data of the neural network based on a minimum value and a maximum value of the input data among the original training data. The processor 200 may mask a portion of output data of the neural network among the original training data.

The processor 200 may calculate a modification range based on a feature of the training data, the minimum value and the maximum value of the input data.

The processor 200 may generate an expanded range by expanding the minimum value and the maximum value based on the modification range. The processor 200 may generate the random input data based on the expanded range.

The processor 200 may obtain the first prediction value and the first loss from the neural network based on the random training data.

The processor 200 may obtain a second prediction value from the neural network by adjusting the random training data based on the original training data using trend information. The processor 200 may generate training data reflecting a trend by adjusting the random training data using the trend information. The processor 200 may obtain the second prediction value from the neural network based on the training data reflecting the trend.

The processor 200 may simultaneously obtain the first prediction value and the second prediction value in a process of calculating a loss by training the neural network using the random training data.

The processor 200 may determine a target loss by modifying the first loss based on the first prediction value and the second prediction value. The processor 200 may calculate a trend loss based on a difference between the first prediction value and the second prediction value.

When the output data of the neural network changes in a direction of increasing by the trend, the processor 200 may calculate the trend loss based on a value obtained by subtracting the second prediction value from the first prediction value.

When the output data of the neural network changes in a direction of decreasing by the trend, the processor 200 may calculate the trend loss based on a value obtained by subtracting the first prediction value from the second prediction value.

The processor 200 may determine the target loss by modifying the first loss based on the trend loss. The processor 200 may determine a hyperparameter for the trend loss. The processor 200 may determine the target loss by adding a product of the hyperparameter and the trend loss to the first loss.

The processor 200 may train the neural network based on the target loss.

The processor 200 may read/write neural network data, for example, text data, voice data, image data, feature map data, kernel data, etc., from/to the memory 920 and execute a neural network using the read/written data. When the neural network is executed, the processor 200 may repeatedly perform convolution operations between an input feature map and a kernel, in order to generate data with respect to an output feature map. Here, a number of operations of the convolution operation may be determined, depending on various factors, such as, for example, the number of channels of the input feature map, the number of channels of the kernel, a size of the input feature map, a size of the kernel, and a precision of a value. The neural network may be implemented as a complicated architecture, where the processor 200 performs the convolution operation with an operation count of up to hundreds of millions to tens of billions, and the frequency at which the processor 200 accesses the memory 300 for the convolution operations rapidly increases.

The memory 300 may store data for the neural network operation and the neural network. The memory 300 stores instructions (or programs) executable by the processor 200. For example, the instructions may include instructions for executing an operation of the processor and/or instructions for performing an operation of each component of the processor.

The memory 300 is implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 300 is provided below.

Figure 2:
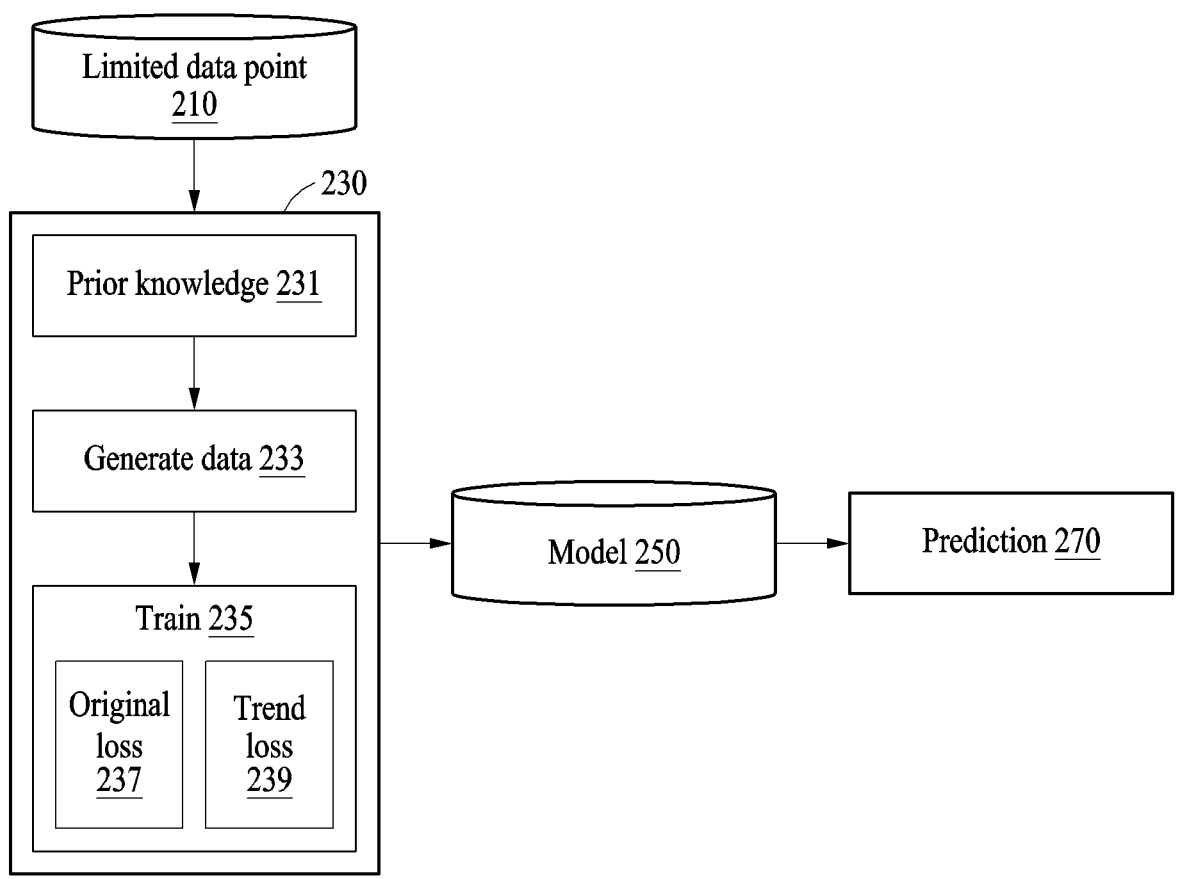
FIG. 2 illustrates an example of an operation of the neural network training apparatus of FIG. 1.

FIG. 2 illustrates an example of an operation of the neural network training apparatus of FIG. 1.

Referring to FIG. 2, in a process of training a neural network (for example, a deep learning model), when a quantity of training data is limited, a processor (for example, the processor 200 of FIG. 1) may train the neural network by supplementing the training data.

When a quantity of data for neural network training is small, learning an accurate distribution in a wide input data region may be difficult, and the possibility that the neural network accurately reflects an actual trend may decrease. The processor 200 may allow the neural network to learn more diverse ranges of actual distribution that are more accurate than a distribution embedded in the training data by utilizing data for training that is arbitrarily generated using the trend information.

The processor 200 may guide a direction of training using domain knowledge of original data as prior knowledge to calculate a loss of the neural network. Through the above-described training method, the processor 200 may enhance an inference performance of the neural network.

A receiver (for example, the receiver 100 of FIG. 1) may receive original training data. The original training data may include a limited data point 210. The limited data point 210 may refer to raw data used for training the neural network. The limited data point 210 may refer to data with a limited distribution or with an extremely limited number of samples. For example, the limited data point 210 may have a shape of Y including a label and a shape of X including predetermined features.

In operation 230, the processor 200 may train the neural network based on the original training data and trend information. The trend information may include prior knowledge 231. The prior knowledge 231 may refer to domain knowledge. The processor 200 may calculate trend loss 239 using the prior knowledge 231.

In operation 233, the processor 200 may generate training data based on the original training data and the trend information. For example, the processor 200 may generate training data to have a diverse distribution, advantageous in the training of the neural network, by using the prior knowledge 231 and the limited data point 210.

Through generating data, the processor 200 may secure augmented training data compared to an input. The processor 200 may obtain a range by extracting minimum values and maximum values for respective features of input data X. The processor 200 may perform min−(n*range), max+(n*range) in a range of original x to expand the obtained range by equal to or more than n (for example, n is a real number) times and may generate random data in the expanded range having a new minimum range and a new maximum range.

Since there is risk in generating a Y (ground truth) value in a process of generating the random data by expanding a range of data, the processor 200 may perform masking so that the Y value may not be directly included in the loss calculation. The processor 200 may prevent masked data from being included in an original loss calculation to learn to predict the Y value by masking the Y value using a predetermined value.

In operation 235, the processor 200 may train the neural network using augmented data. The processor 200 may train the neural network using an original loss 237 and a trend loss 239.

The processor 200 may augment input data compared to original input data through the above-described data generating process. Output data may include information on a hyperparameter and a neural network model used for prediction after the entire training process has been completed.

The processor 200 may calculate a loss at a minibatch level and may update a model parameter of the neural network. The processor 200 may calculate a target loss by combining the original loss 237 and the trend loss 239 to be used for training the neural network.

The original loss 237 may represent a difference between a ground truth value and a prediction value by a general neural network model. The original loss 237 may include a first loss. The processor 200 may calculate the first prediction value using the original loss 237.

The trend loss 237 may include a second loss. The trend loss 237 may modify an X portion (for example, input data) of data by delta using the prior knowledge (or, domain knowledge) and may represent a loss calculated in a process of obtaining an X value drawn by using the modified X. For example, the trend loss may reflect information on a particular phenomenon learned from physical knowledge (for example, f=ma), or know-how acquired from an experienced engineer, or know-how acquired from an experienced user. The processor 200 may obtain new input data X2 by increasing or decreasing an adjustment unit based on prior knowledge of a predetermined factor of original training data X based on the prior knowledge and may obtain the second prediction value by inputting the X2 to the neural network.

The processor 200 may calculate an additional training loss based on a difference between the first prediction value and the second prediction value. If virtual training data may be designed to have a tendency for a Y value to increase, the second prediction value may have a value greater than 0. In another example, if the neural network is trained in a way opposite to prior knowledge, a value obtained by subtracting the second prediction value from the first prediction value may be a positive number. Thus, the processor 200 may add the value obtained by subtracting the second prediction value from the first prediction value to the loss. The trend loss may be expressed by Equation 1.

$$\text{Trend loss} = \max(0, (\text{first prediction value} - \text{second prediction value})) \qquad \text{[Equation 1]}$$

The processor 200 may calculate a target loss by adding a trend loss to an original loss. For example, the target loss may be expressed by Equation 2.

$$\text{Target loss} = \text{original loss} + (\text{alpha} * \text{trend loss}) \qquad \text{[Equation 2]}$$

In an example, alpha may denote a hyperparameter to adjust a trade-off between the original loss and the trend loss.

The processor 200 may return a final neural network model 250 by finally determining a model parameter of the neural network by performing training.

The processor 200 may perform a prediction 270 using the returned neural network model.

FIG. 3 illustrates an example of a trend learning process of the neural network training apparatus of FIG. 1. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, a processor (for example, the processor 200 of FIG. 1) may train a neural network model having a deep neural network structure based on training data including input data X and output data Y. The processor 200 may predict output data for arbitrary input data using the trained neural network. X may include a data feature and Y may include a target value to be predicted.

A receiver (for example, the receiver 100 of FIG. 1) may receive original training data and trend information. In operation 310, the processor 200 may randomly generate training data based on range extrapolation and masked label.

The processor 200 may obtain a range by extracting minimum values and maximum values based on respective features of the input data X. The processor 200 may expand a range of original X to have a wider range by equal to or more than n (for example, n is a real number) times than the obtained range. For example, the processor 200 may randomly generate input data by expanding a range of original X by min−(n*range), max+(n*range) to have a new minimum value range and a new maximum value range.

To prevent a risk caused by generating a Y (for example, ground truth) value in a process of randomly generating input data by expanding the input data, the processor 200 may prevent masked data from being included in calculating an original loss by masking the Y value using a predetermined value.

In operation 330, the processor 200 may calculate a prediction value (for example, the first prediction value) and a loss (for example, the first loss) using an arbitrary training method.

In operation 350, the processor 200 may add a delta value to a predetermined feature value and may obtain a new prediction value (for example, the second prediction value). The processor 200 may obtain a new prediction value for the input data X virtually generated using the trend information (for example, prior knowledge or domain information). The trend information used by the processor 200 may include a direction of a change in data, physical knowledge, or know-how acquired from experience.

The processor 200 may increase or decrease an adjustment unit known in advance for a predetermined factor of original input data using the trend information. The processor 200 may obtain the second prediction value using the adjusted input data as input data of the neural network.

In operation 370, the processor 200 may update a model parameter of the neural network based on the original loss and a trend loss. The processor 200 may modify the original loss (for example, the first loss) using a difference between the first prediction value and the second prediction value. The processor 200 may calculate the trend loss based on the difference between the first prediction value and the second prediction value.

If the input data adjusted using the trend information is designed to have a tendency for Y to increase, the second prediction value may have a value greater than 0. However, if the neural network is trained in a way opposite to the prior knowledge, a value obtained by subtracting the second prediction value from the first prediction value may be a positive number. Thus, the processor 200 may calculate the trend loss using the value obtained by subtracting the second prediction value from the first prediction value.

For example, the processor 200 may calculate the trend loss using Equation 1. The processor 200 may determine a weight for the trend loss using an alpha value of Equation 2. The processor 200 may calculate the target loss by Equation 2.

The processor 200 may obtain a final neural network model by training the neural network using the target loss. In operation 390, the processor 200 may obtain a prediction performance using the obtained neural network model.

Figure 5:
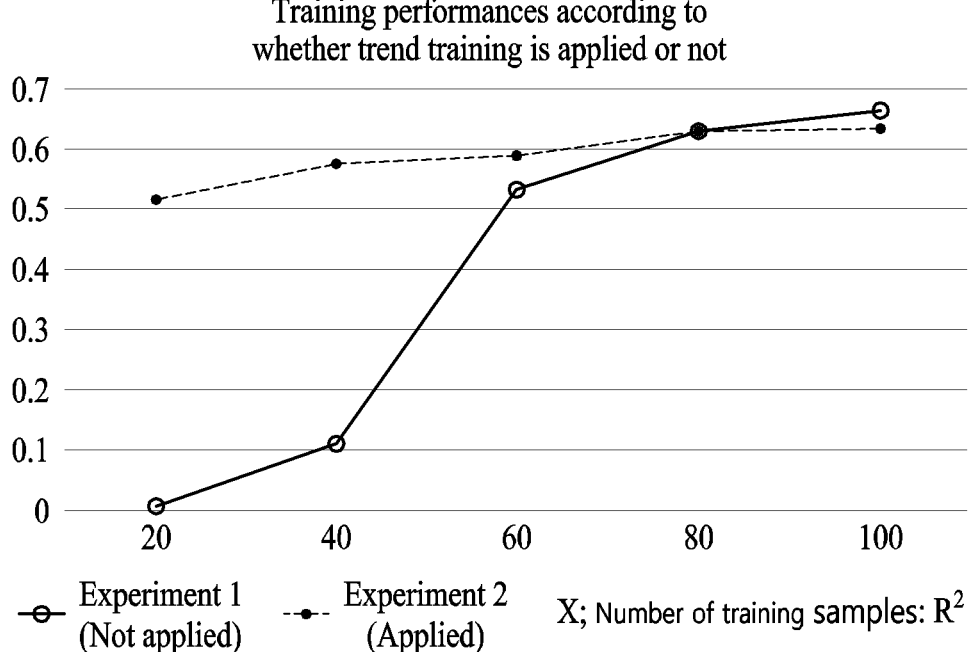
FIG. 5 illustrates an example of performances according to whether trend training is applied or not.

FIG. 4 illustrates an example of an algorithm performed by the neural network training apparatus of FIG. 1. FIG. 5 illustrates an example of performances according to whether trend training is applied or not.

Referring to FIGS. 4 and 5, a processor (for example, the processor 200 of FIG. 1) may obtain a first prediction value (for example, $\hat{Y}$) and a first loss (for example, $Loss_{org}$) from a neural network based on original training data. The processor 200 may generate random training data based on a feature of the original training data.

The processor 200 may generate random input data (for example, $X_{rand}$) by modifying a range of input data based on a minimum value and a maximum value of the input data (for example, X) of the neural network among the original training data. The processor 200 may mask a portion of output data of the neural network from among the original training data.

The processor 200 may calculate a modification range based on a feature of the training data, a minimum value, and a maximum value of training data.

The processor 200 may generate an expanded range by expanding the minimum value and the maximum value based on the modification range. The processor 200 may generate the random input data based on the expanded range.

The processor 200 may obtain the first prediction value and the first loss from the neural network based on the random training data.

The processor 200 may obtain a second prediction value from the neural network by adjusting random training data using trend information. The processor 200 may generate training data reflecting a trend by adjusting the random training data using the trend information. The processor 200 may obtain the second predicted value (for example, $\hat{Y}_{sens}$), from the neural network based on training data reflecting the trend.

The processor 200 may determine a target loss (for example, Loss) by modifying the first loss based on the first prediction value and the second prediction value. The processor 200 may calculate a trend loss (for example, $Loss_{sens}$) based on a difference between the first prediction value and the second prediction value.

When output data of the neural network changes in a direction of increasing by the trend, the processor 200 may calculate the trend loss based on a value obtained by subtracting the second prediction value from the first prediction value.

When the output data of the neural network changes in a direction of decreasing by the trend, the processor 200 may calculate the trend loss based on a value obtained by subtracting the first prediction value from the second prediction value.

The processor 200 may determine the target loss by modifying the first loss based on the trend loss. The processor 200 may determine a hyperparameter (for example, α) for the trend loss. The processor 200 may determine the target loss by adding a product of the hyperparameter and the trend loss to the first loss.

The processor 200 may train the neural network based on the target loss. The processor 200 may train the neural network by supervised learning or unsupervised learning.

Supervised learning may be a method of inputting input data to the neural network with corresponding output data and updating a connection weight of connecting lines to output the output data corresponding to input data.

For example, the processor 200 may update a connection weight among artificial neurons through delta rule and error backpropagation learning.

Error backpropagation learning may be a method of estimating an error by a forward computation for a given training data, propagating the estimated error by forwarding in the opposite direction starting from an output layer to a hidden layer and an input layer, and updating a connection weight in a direction of reducing an error.

A process of the neural network may proceed in a direction of an input layer, a hidden layer, and an output layer. However, updating the connection weight in error backpropagation learning may proceed in a direction of the output layer, the hidden layer, and an input layer.

The processor 200 may define an objective function to measure how close a currently set connection weight is to optimum, may continuously change the connection weights based on a result of the objective function, and may repeatedly perform training.

For example, the objective function may be an error function to calculate an error between an expected value desired to be output and an actual value output from the neural network based on training data. The processor 200 may update connection weights in a direction of reducing a value of the error function.

When a quantity of the training data is small or a distribution is limited, the processor 200 may generate new training data using the above-described training process to allow a normalization layer of the neural network to learn more diverse distributions compared to a case where only original training data is used.

The processor 200 may prevent a performance degradation of the neural network and achieve more accurate prediction by calculating the trend loss and causing the prior knowledge to serve as a baseline of a training direction of the neural network. An example of FIG. 5 may represent a comparison result showing that a performance may be enhanced in a case where trend training is performed using the trend loss compared to a case where trend training is not applied.

Figure 6:
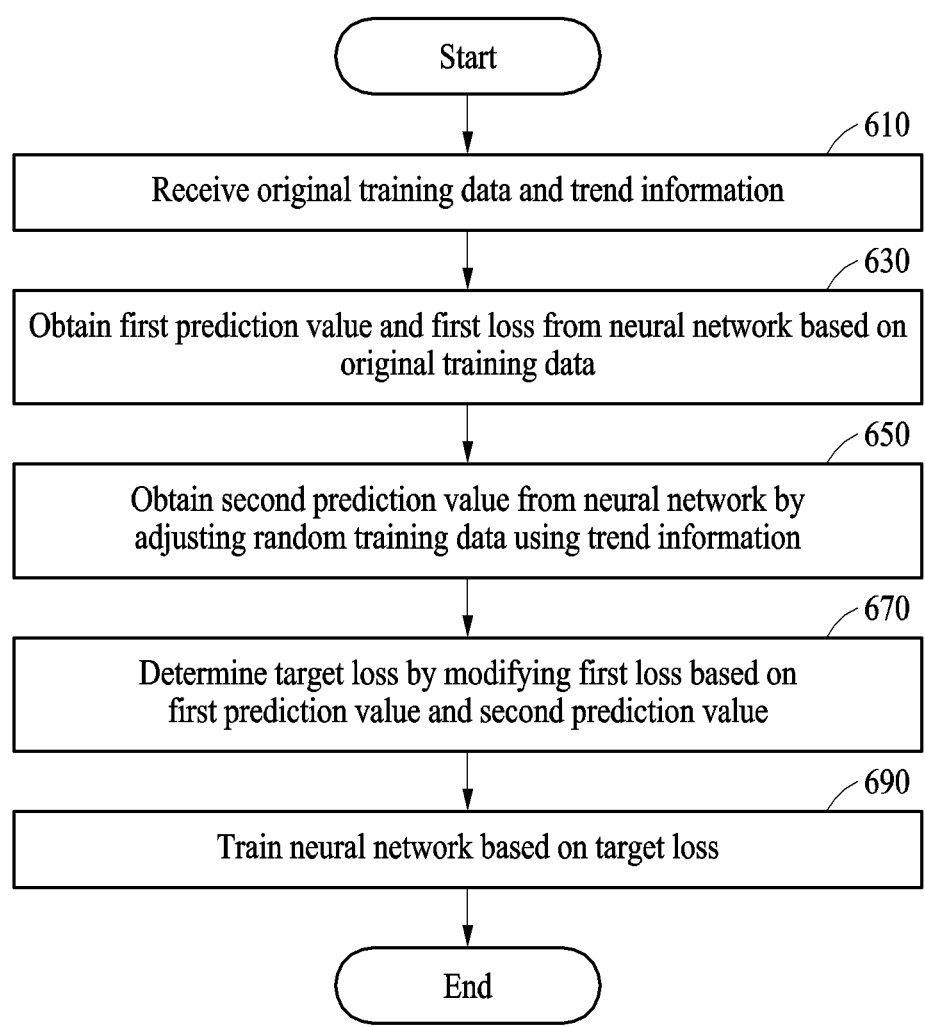
FIG. 6 illustrates an example of a flow of operation of the neural network training apparatus of FIG. 1.

FIG. 6 illustrates an example of a flow of operation of the neural network training apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a receiver (for example, the receiver 100 of FIG. 1) may receive trend information and original training data. The trend information may include information on a direction of a change in training data.

In operation 630, processor (for example, the processor 200 of FIG. 1) may obtain a first prediction value and a first loss from the neural network based on the original training data. The processor 200 may generate random training data based on a feature of the original training data.

The processor 200 may generate random input data by modifying a range of input data of the neural network based on a minimum value and a maximum value of the input data from among the original training data. The processor 200 may mask a portion of output data of the neural network from among the original training data.

The processor 200 may calculate a modification range based on a feature of the original training data, the minimum value and the maximum value of the input data.

The processor 200 may generate an expanded range by expanding the minimum value and the maximum value based on the modification range. The processor 200 may generate the random input data based on the expanded range.

The processor 200 may obtain the first prediction value and the first loss from the neural network based on the random training data.

In operation 650, the processor 200 may obtain a second prediction value from the neural network by adjusting the random training data using the trend information. The processor 200 may generate training data reflecting the trend by adjusting the random training data using the trend information. The processor 200 may obtain the second prediction value from the neural network based on the training data reflecting the trend.

In operation 670, the processor 200 may determine a target loss by modifying the first loss based on the first prediction value and the second prediction value. The processor 200 may calculate a trend loss based on a difference between the first prediction value and the second prediction value.

When output data of the neural network changes in a direction of increasing by the trend, the processor 200 may calculate the trend loss based on a value obtained by subtracting the second prediction value from the first prediction value.

When the output data of the neural network changes in a direction of decreasing by the trend, the processor 200 may calculate the trend loss based on a value obtained by subtracting the first prediction value from the second prediction value.

The processor 200 may determine the target loss by modifying the first loss based on the trend loss. The processor 200 may determine a hyperparameter for the trend loss. The processor 200 may determine the target loss by adding a product of the hyperparameter and the trend loss to the first loss.

In operation 690, the processor 200 may train the neural network based on the target loss.

The processor 200, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network training method using trend. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network training method using trend information for performance degradation prevention, the neural network training method comprising:

receiving original training data and the trend information;

obtaining a first prediction value and a first loss from a neural network based on the original training data;

obtaining a second prediction value from the neural network based on the original training data using the trend information;

determining a target loss by modifying the first loss based on the first prediction value and the second prediction value; and training the neural network based on the target loss, wherein the obtaining of the second prediction value from the neural network based on the original training data using the trend information comprises:

adjusting, using the trend information, random training data generated based on a feature of the original training data; and obtaining the second prediction value from the neural network using the adjusted random training data.

2. The neural network training method of claim 1, wherein the trend information comprises information on a direction of a change in the training data.

3. The neural network training method of claim 1, wherein the obtaining of the first prediction value and the first loss comprises:

generating the random training data based on the feature of the original training data; and obtaining the first prediction value and the first loss from the neural network based on the random training data.

4. The neural network training method of claim 3, wherein the generating of the random training data comprises:

generating random input data by modifying a range of input data of the neural network based on a minimum value and a maximum value of the input data from among the original training data; and masking a portion of output data of the neural network from among the original training data.

5. The neural network training method of claim 4, wherein the generating of the random input data comprises:

calculating a modification range based on the minimum value, the maximum value, and the feature;

generating an expanded range by expanding the minimum value and the maximum value based on the modification range; and generating the random input data based on the expanded range.

6. The neural network training method of claim 3, wherein the obtaining of the second prediction value comprises:

performing the adjusting of the random training data to reflect a trend using the trend information.

7. The neural network training method of claim 1, wherein the determining of the target loss comprises:

calculating a trend loss based on a difference between the first prediction value and the second prediction value; and determining the target loss by modifying the first loss based on the trend loss.

8. The neural network training method of claim 7, wherein the calculating of the trend loss based on the difference between the first prediction value and the second prediction value comprises:

calculating the trend loss based on subtracting the second prediction value from the first prediction value, in response to the output data of the neural network changing in an increasing direction by a trend reflected by the trend information; and calculating the trend loss based on subtracting the first prediction value from the second prediction value, in response to the output data of the neural network changing in a decreasing direction by the trend reflected by the trend information.

9. The neural network training method of claim 7, wherein the determining of the target loss by modifying the first loss based on the trend loss comprises:

determining a hyperparameter for the trend loss; and determining the target loss by adding a product of the hyperparameter and the trend loss to the first loss.

10. A non-transitory computer-readable storage medium storing instructions that, when executed by one or more processors, cause the one or more processors to perform the neural network training method of claim 1.

11. A neural network training apparatus using trend information for performance degradation prevention, the neural network training apparatus comprising:

one or more processors configured to:

obtain a first prediction value and a first loss from a neural network based on original training data;

obtain a second prediction value from the neural network based on the original training data using the trend information;

determine a target loss by modifying the first loss based on the first prediction value and the second prediction value; and train the neural network based on the target loss, wherein, for the obtaining of the second prediction value from the neural network based on the original training data using the trend information, the one or more processors are configured to:

adjust, using the trend information, random training data generated based on a feature of the original training data; and obtain the second prediction value from the neural network using the adjusted random training data.

12. The neural network training apparatus of claim 11, wherein the trend information comprises information on a direction of a change in the training data.

13. The neural network training apparatus of claim 11, wherein the one or more processors are further configured to:

generate the random training data based on the feature of the original training data; and obtain the first prediction value and the first loss from the neural network based on the random training data.

14. The neural network training apparatus of claim 13, wherein, for the generation of the random training data, the one or more processors are further configured to:

generate random input data by modifying a range of input data of the neural network based on a minimum value and a maximum value of the input data from among the original training data; and mask a portion of output data of the neural network from among the original training data.

15. The neural network training apparatus of claim 14, wherein the one or more processors are further configured to:

calculate a modification range based on the minimum value, the maximum value, and the feature;

generate an expanded range by expanding the minimum value and the maximum value based on the modification range; and generate the random input data based on the expanded range.

16. The neural network training apparatus of claim 13, wherein the one or more processors are further configured to:

perform the adjusting of the random training data to reflect a trend using the trend information.

17. The neural network training apparatus of claim 11, wherein the one or more processors are further configured to:

calculate a trend loss based on a difference between the first prediction value and the second prediction value; and determine the target loss by modifying the first loss based on the trend loss.

18. The neural network training apparatus of claim 17, wherein the one or more processors are further configured to:

calculate the trend loss based on subtracting the second prediction value from the first prediction value, in response to the output data of the neural network changing in an increasing direction by a trend reflected by the trend information; and calculate the trend loss based on subtracting the first prediction value from the second prediction value, in response to the output data of the neural network changing in a decreasing direction by the trend reflected by the trend information.

19. The neural network training apparatus of claim 17, wherein the one or more processors are further configured to:

determine a hyperparameter for the trend loss; and determine the target loss by adding a product of the hyperparameter and the trend loss to the first loss.

20. A neural network training method using trend information for performance degradation prevention, the neural network training method comprising:

generating random training data based on a feature of original training data;

obtaining a first prediction value and a first loss from a neural network based on the random training data;

adjusting the random training data using the trend information;

obtaining a second prediction value from the neural network based on the adjusted random training data;

determining a target loss by modifying the first loss based on the first prediction value and the second prediction value; and training the neural network based on the target loss.

21. The neural network training method of claim 20, wherein the generating of the random training data comprises modifying a range of input data of the neural network based on a minimum value and a maximum value of the input data from among the original training data.

22. The neural network training method of claim 21, wherein the generating of the random training data comprises:

calculating a modification range based on a feature of the original training data, the minimum value, and the maximum value; and generating the random training data from by expanding a range of the minimum value and the maximum value based on the modification range.

23. The neural network training method of claim 20, wherein the determining of the target loss comprises:

determining a trend loss based on a difference between the first prediction value and the second prediction value;

determining a hyperparameter to adjust between the first loss and the trend loss; and determining the target loss based on adding a product of the hyperparameter and the trend loss to the first loss.

24. The neural network training method of claim 1, wherein the trend information is trend information regarding the training data.

* * * * *